United States Patent
Lee et al.

(10) Patent No.: US 7,745,028 B2
(45) Date of Patent: Jun. 29, 2010

(54) FUEL CELL SYSTEM

(75) Inventors: Dong-Hun Lee, Suwon-si (KR); Ho-Jin Kweon, Suwon-si (KR); Seong-Jin An, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 692 days.

(21) Appl. No.: 11/044,049

(22) Filed: Jan. 28, 2005

(65) Prior Publication Data

US 2005/0164058 A1    Jul. 28, 2005

(30) Foreign Application Priority Data

Jan. 28, 2004    (KR)    ............... 10-2004-0005396

(51) Int. Cl.
*H01M 8/04* (2006.01)
*H01M 8/10* (2006.01)

(52) U.S. Cl. ............... 429/25; 429/34; 429/19; 429/32; 429/13

(58) Field of Classification Search ............ 429/25, 429/34, 19, 32, 13
See application file for complete search history.

(56) References Cited

U.S. PATENT DOCUMENTS

| | | | | |
|---|---|---|---|---|
| 6,802,876 | B1 * | 10/2004 | Kobayashi et al. | 48/127.9 |
| 6,844,094 | B2 * | 1/2005 | Kobayashi et al. | 429/25 |
| 2002/0061426 | A1 * | 5/2002 | Imaseki et al. | 429/26 |
| 2002/0119352 | A1 * | 8/2002 | Baldauf et al. | 429/13 |
| 2003/0148167 | A1 * | 8/2003 | Sugawara et al. | 429/34 |
| 2003/0217773 | A1 * | 11/2003 | Yamada et al. | 137/565.33 |
| 2004/0101734 | A1 * | 5/2004 | Morishima et al. | 429/34 |
| 2004/0106021 | A1 * | 6/2004 | Kanai et al. | 429/22 |

FOREIGN PATENT DOCUMENTS

| | | |
|---|---|---|
| JP | 2002-33110 | 1/2002 |
| JP | 2002-033110 * | 1/2002 |
| JP | 2003520392 | 7/2003 |
| JP | 2003338302 | 11/2003 |

\* cited by examiner

*Primary Examiner*—Dah-Wei Yuan
*Assistant Examiner*—Angela J. Martin
(74) *Attorney, Agent, or Firm*—H.C. Park & Associates, PLC

(57) ABSTRACT

A fuel cell system comprising a fuel tank, a stack generating electrical energy using fuel and an oxidizer supplied thereto, and a pressure reducing unit supplying the fuel from a fuel tank to the stack while maintaining the pressure of the stack lower than the atmospheric pressure is provided.

9 Claims, 3 Drawing Sheets

FUEL CELL SYSTEM

CROSS REFERENCE TO RELATED APPLICATION

This application claims priority to and the benefit of Korean Patent Application No. 10-2004-0005396, filed on Jan. 28, 2004, which is hereby incorporated by reference for all purposes as if fully set forth herein.

BACKGROUND OF THE INVENTION

1. Field of the Invention

The present invention relates to a fuel cell system, and more particularly, to a fuel supply unit of a fuel cell system.

2. Description of the Related Art

In general, a fuel cell is an electricity generating system directly converting chemical energy into electrical energy through an chemical reaction between oxygen contained in the air and hydrogen contained in hydrocarbon-containing materials such as methanol and natural gas.

Commonly used fuel cells include a phosphate fuel cell, a molten carbonate fuel cell, and the like. Recently, a polymer electrolyte membrane fuel cell (PEMFC) has been developed as a highly efficient fuel cell.

The polymer electrolyte membrane fuel cell has an excellent output characteristic, a low operating temperature, and a fast starting and response characteristic compared to other fuel cells. It uses hydrogen obtained by reforming methanol, natural gas, etc. Accordingly, the PEMFC has a wide range of applications such as a mobile power source for vehicles, a distributed power source for the home or buildings, and a small-sized power source for electronic apparatuses.

The aforementioned PEMFC basically comprises a fuel cell main body called a stack, a fuel tank, and a fuel pump supplying fuel to the stack from the fuel tank. When methanol is used as the fuel, such a fuel cell further comprises a reformer which converts the methanol to generate hydrogen.

The stack comprises a membrane-electrode assembly (MEA) having an anode, a cathode, and an electrolyte membrane integrally formed with the electrodes, and a separator (or a bipolar plate) for electrically connecting the MEAs to each other at the time of stacking a plurality of MEAs.

Alternatively, the a fuel cell can employ a direct methanol fuel cell (DMFC) scheme which directly supplies liquid-state fuel containing hydrogen to the stack and to generating electricity. The fuel cell employing the DMFC scheme does not require the reformer, unlike the PEMFC.

As the fuel cell system operates, water is generated as a byproduct in a chemical reaction in the stack causing a gas passage to be blocked or a surface thereof to be corroded by the water, which leads to a decrease in efficiency. Hence, the separator needs to have strong corrosion resistance. To prevent the separator from being deteriorated in the conventional fuel cell system, a method of vaporizing the water generated in the stack has been studied. However, research has demonstrated that a solid oxide fuel cell (SOFC) working at a high temperature of about 600 to 1,000° C. could be developed, but the same result could not be achieved for the PEMFC or the DMFC working at a relatively low temperature of about 60 to 100° C. or from a room temperature to 45° C. Prior to this invention, it has not been possible to reliably prevent the separators, from being damaged due to water generated in the stack in the proposed fuel cell system.

SUMMARY OF THE INVENTION

The present invention solves the above problems, and it is an object of the present invention to provide a fuel cell system capable of preventing elements of a stack from being damaged due to water generated in the stack.

According to an aspect of the present invention, a fuel cell system comprising a fuel tank, a stack generating electricity using fuel and oxidizer supplied thereto, and a pressure reducing unit supplying the fuel from a fuel tank to the stack while maintaining the pressure of the stack lower than the atmospheric pressure is provided.

According to another aspect of the present invention, a fuel cell system comprising a fuel tank, a stack generating electricity using fuel and oxidizer supplied thereto, and a vacuum pump being connected to the stack and supplying the fuel from the fuel tank to the stack is provided. At this time, the stack is disposed between the fuel tank and the vacuum pump.

In the fuel cell system, a reformer which converts the fuel supplied from the fuel tank to generate gas containing hydrogen may be disposed between and connected to both the fuel tank and the stack. Further, a constant pressure regulator valve may be disposed between and be connected to both the stack and the fuel tank. When the fuel cell system has a reformer, the constant pressure regulator valve may be disposed between the reformer and the fuel tank and be connected to the reformer and the fuel tank.

The fuel cell system according to the present invention may employ a polymer electrolyte membrane fuel cell (PEMFC) scheme or a direct methanol fuel cell (DMFC) scheme.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE EMBODIMENTS

Hereinafter, embodiments of the present invention will be described in detail with reference to the accompanying drawings such that the embodiments can be easily put into practice by those skilled in the art. However, since the present invention can be embodied in various forms, the present invention is not limited to the embodiments described below.

Figure 1:
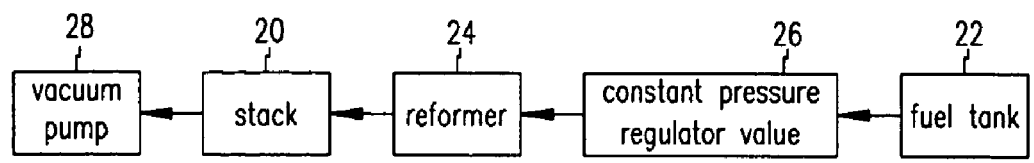
FIG. 1 is a schematic diagram illustrating a fuel cell system according to an embodiment of the present invention.

FIG. 1 is a schematic diagram illustrating a fuel cell system according to an embodiment of the present invention.

A fuel cell system shown in FIG. 1 employs a polymer electrolyte membrane fuel cell (PEMFC) scheme. However, the present invention may be applied to a fuel cell system employing other schemes. Therefore, the PEMFC system explained in the following description is intended to exemplify the present invention, and the present invention is not limited thereto. As shown in FIG. 1, the PEMFC system basically comprises a fuel cell, that is, a stack 20, for generating electrical energy using fuel and oxidizer supplied thereto. The stack 20 can have a conventional structure of the PEMFC system and description thereof will be omitted. A reformer 24 converts the fuel such as methanol supplied from a fuel tank 22 to generate hydrogen gas is connected to the stack 20. A constant pressure regulator valve 26 may be disposed between the reformer 24 and the fuel tank 22 and supply the fuel from the fuel tank 22 to the reformer 24 with a constant pressure. In addition, a vacuum pump 28 supplies the fuel stored in the fuel tank 22 to the stack 20 is connected to the stack 20.

In this invention, the vacuum pump 28 is not connected to the fuel tank 22, unlike in the conventional fuel cell system. The vacuum pump 28 is connected to the stack 20 such that the vacuum pump 28 is connected in advance to the fuel tank 22.

The vacuum pump 28 supplies the fuel to the stack 20 by sucking the fuel in the fuel tank 22 into the stack 20 with a suctioning power thereof, where the vacuum pump 28 is positioned in front of the stack 20. While passing through the reformer 24, the fuel is converted into hydrogen gas which is supplied to the stack 20.

In the PEMFC system described above, the hydrogen gas and oxygen contained in the air supplied to the stack 20 chemically react with each other to generate electric energy.

One side of the stack 20, that is, a side to which the hydrogen gas is supplied is maintained at a pressure close to the atmospheric pressure. The other side of the stack 20, that is, a side to which the vacuum pump is connected is maintained at a pressure lower than the atmospheric pressure. This is because the vacuum pump 28 serves as a pressure reducing unit to reduce the pressure of the stack 20 to a pressure lower than the atmospheric pressure as it supplies the hydrogen gas required for generating electricity from the fuel tank 22 to the stack 20.

As a result, the inside of the stack 20 in which the hydrogen gas and oxygen chemically react with each other is substantially maintained at a pressure (for example, about 0.9 to 0.4 atm) lower than atmospheric pressure, so that the chemical reaction occurs at a pressure lower than the atmospheric pressure. Since the chemical reaction occurs in the stack 20 at a pressure lower than the atmospheric pressure, the water generated through the chemical reaction can be boiled and vaporized at a temperature lower than the boiling point of water at atmospheric pressure.

Figure 2:
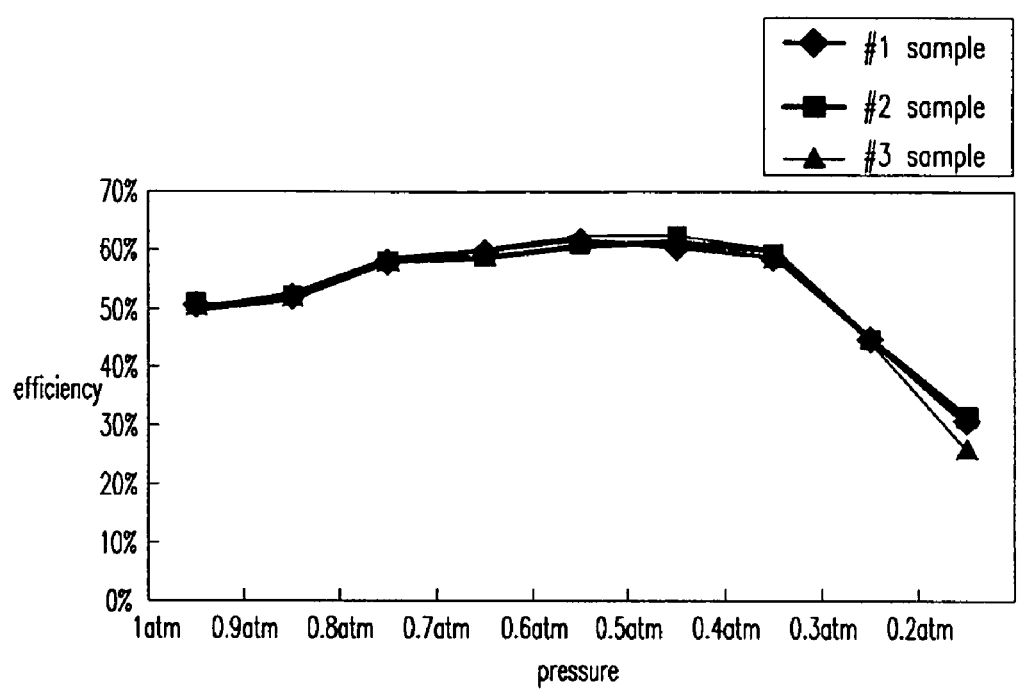
FIG. 2 is a graph showing a relationship between the pressure of a stack and an efficiency of the fuel cell system according to an embodiment of the present invention.

FIG. 2 graphically demonstrates the relationship between the pressure in the stack and the water vaporization efficiency, according to the data obtained through experiments by the inventor. As shown in FIG. 2, when the inside of the stack 20 is preferably maintained at about 0.9 to 0.4 atm, the vaporization is carried out with excellent efficiency.

Figure 3:
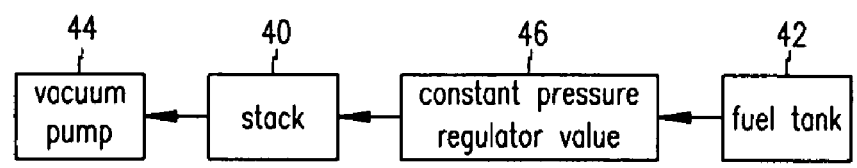
FIG. 3 is a schematic diagram illustrating a fuel cell system according to another embodiment of the present invention.

In contrast to the aforementioned PEMFC system, the present invention may be applied to the system shown in FIG. 3, as described above. Specifically, the present invention may be applied to a DMFC system in which a reformer is not provided between the stack 40 and the fuel tank 42. Instead, in the DMFC system, a vacuum pump 44 is connected to the stack 40 to directly supply liquid methanol fuel from the fuel tank 42 to the stack 40 while maintaining the pressure of the stack 40 at a pressure lower than the atmospheric pressure. As a result, electrical energy is generated in the stack and water generated as a byproduct is boiled and vaporized at a low temperature.

In FIG. 3, reference numeral 46 denotes the constant pressure regulator valve disposed between the stack 40 and the fuel tank 42.

In the fuel cell system according to the present invention, the water generated in the stack is vaporized at a low temperature, so that the water generated as a byproduct does not remain in the stack. Therefore, it is possible to prevent the constituent members of the stack such as a separator from being damaged by the water. This fuel cell system has excellent efficiency and durability due to the smooth operation of the stack, which thereby enhances the entire function of the fuel cell system.

Although the exemplary embodiments of the present invention have been described above, the present invention is not limited to those embodiments. It may be modified in various forms without departing from the scope of the claims, the detailed description, and the accompanying drawings of the present invention. Therefore, it is natural that such modifications are within the scope of the present invention.

What is claimed is:

1. A fuel cell system, comprising:
a fuel tank;
a stack generating electrical energy using fuel and oxidizer supplied thereto; and
a pressure reducing unit supplying the fuel from the fuel tank to the stack while maintaining the pressure of the stack lower than the atmospheric pressure.

2. The fuel cell system of claim 1, wherein the pressure reducing unit is a vacuum pump.

3. The fuel cell system of claim 1, further comprising:
a reformer connected to the fuel tank and the stack.

4. The fuel cell system of claim 1, further comprising:
a pressure regulator connected to the stack and the fuel tank.

5. The fuel cell system of claim 3, further comprising:
a pressure regulator connected to the reformer and the fuel tank.

6. The fuel cell system of claim 1, wherein the stack comprises a polymer electrolyte membrane.

7. The fuel cell system of claim 1, wherein a direct methanol fuel cell (DMFC) is employed.

8. The fuel cell system of claim 1, wherein the stack is between the fuel tank and the pressure reducing unit.

9. The fuel cell system of claim 1, wherein the pressure reducing unit sucks fuel through the stack.

* * * * *